United States Patent [19]

Watts

[11] 4,304,282
[45] Dec. 8, 1981

[54] APPARATUS FOR PREVENTING THE SEPARATION OF A TIRE FROM A DROP CENTER WHEEL

[75] Inventor: Loyal O. Watts, Mapleton, Ill.
[73] Assignee: Caterpillar Tractor Co., Peoria, Ill.
[21] Appl. No.: 118,719
[22] PCT Filed: Nov. 26, 1979
[86] PCT No.: PCT/US79/01031
§ 371 Date: Nov. 26, 1979
§ 102(e) Date: Nov. 26, 1979
[51] Int. Cl.³ .................. B60B 21/02; B60B 25/00
[52] U.S. Cl. ............................ 152/381.6; 152/381.3
[58] Field of Search ............ 152/330 RF, 377, 379.4, 152/379.3, 381.3, 381.6, 383, 381.4

[56] References Cited
U.S. PATENT DOCUMENTS
4,016,917  4/1977  Victor .
4,042,003  8/1977  Gaskill et al. .
4,078,597  3/1978  Noda .

FOREIGN PATENT DOCUMENTS
2758342  7/1979  Fed. Rep. of Germany ... 152/379.4
643549   3/1928  France ............................. 152/381.6
2314839  1/1977  France .
258208   4/1928  Italy ................................. 152/381.6

Primary Examiner—Charles A. Marmor
Attorney, Agent, or Firm—Wegner, Stellman, McCord, Wiles & Wood

[57] ABSTRACT

A drop center wheel for use with tubeless tires having a pair of spaced, circumferential, radially outwarding extending bead retention flanges (16) on opposite ends of respective circumferential bead seat surfaces (14). An intermediate, circumferential, drop center (10) is disposed between and interconnects bead seat surfaces and has a lesser diameter than the least diameter of the bead seat surfaces. At least one blocking member (22) is mounted in the drop center for movement between a first position well within the drop center so that its radially outermost point (24) is located a radial distance from the axis of the wheel less than one-half of the least diameter of bead seat surfaces and a second position extending from the drop center such that the radially outermost point is located a radial distance from the axis of the wheel greater than one-half of the least diameter of the bead seat surfaces. The blocking member has a blocking surface (30, 32) sufficiently close in the axial direction to at least one of the bead seat surfaces so as to prevent a tire bead (18, 20) from slipping into the drop center when the blocking member is in the second position to prevent inadvertent demounting of the tire from the wheel.

7 Claims, 3 Drawing Figures

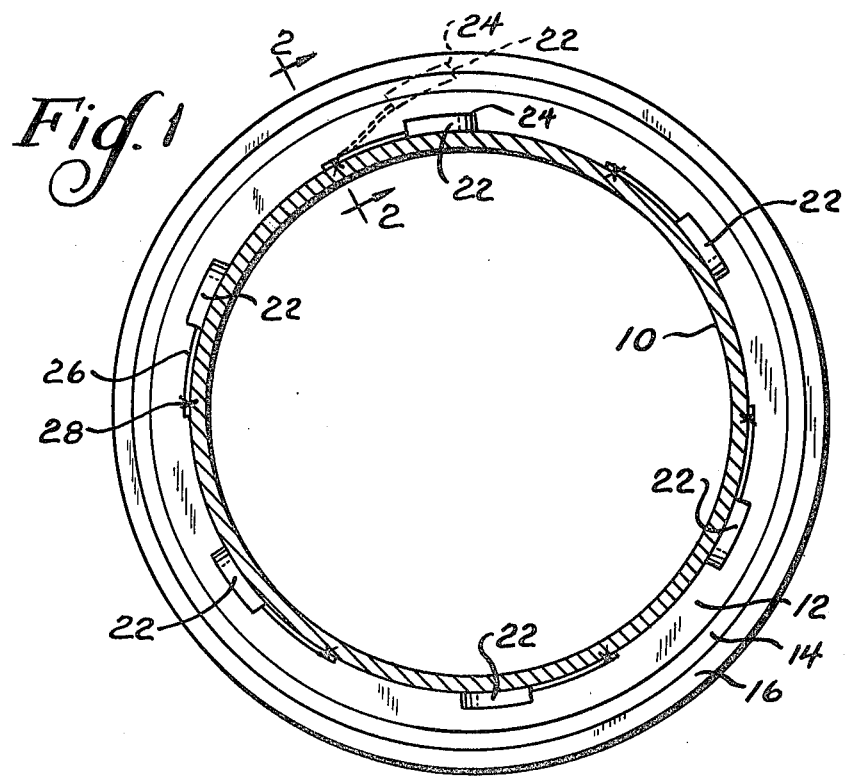
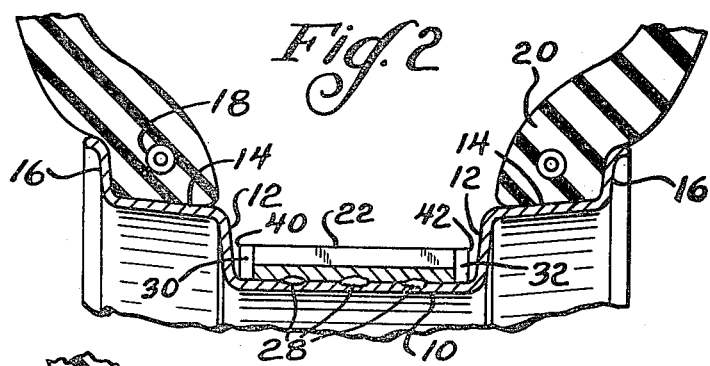
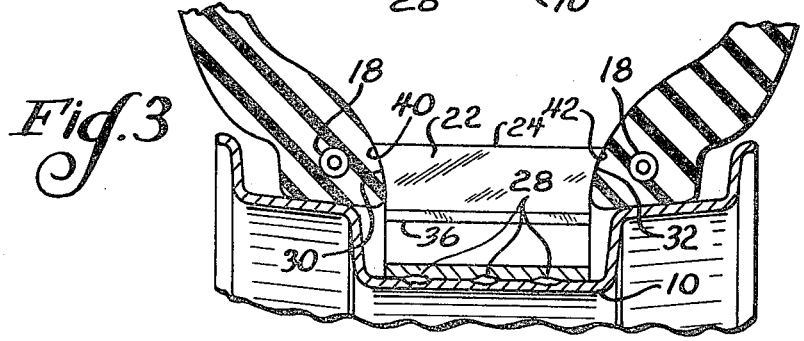

APPARATUS FOR PREVENTING THE SEPARATION OF A TIRE FROM A DROP CENTER WHEEL

DESCRIPTION

1. Technical Field

This invention relates to drop center wheels for use with tubeless tires, and more particularly, to such a wheel provided with means for preventing inadvertent separation of the tire from the wheel while the two are in motion.

2. Background Art

Tubeless tires, since their introduction as original equipment on U.S. manufactured automobiles in the 1950's, are employed almost universally throughout the world in automobiles and are gaining increasing acceptance on larger vehicles such as trucks and even heavy duty, off-the-road vehicles. As is well known, tubeless tires are most often employed on so-called drop center wheels which are one-piece wheels.

Such wheels typically include a pair of spaced, circumferential, radially outwardly extending bead retention flanges, each merging into an associated, slightly conical bead seat surface. Two bead seat surfaces are interconnected by the drop center which is a central portion of the wheel having a lesser diameter than the least diameter of either of the bead seat surfaces.

The beads of tubeless tires are formed in part with a circumferentially inextensible cable and this factor necessitates the use of the drop center in a one-piece wheel. In mounting or demounting such a tire from the wheel, parts of one or both of the beads are urged into the drop center of the wheel so that the remaining part of one or both beads can be drawn about the retention flange to dispose both beads between the flanges. The beads are then seated and sealed in any of a variety of conventional ways to associated ones of the bead seat surfaces and the tire inflated. When the desired inflation is achieved, the beads will not only be firmly seated on their surfaces, but will be in abutment with the retention flanges as well. Thus, the drop center provides for easy mounting and demounting of tubeless tires on a wheel without the removal of parts from the wheel.

The drop center, while providing such advantages, is not without its disadvantages. In the event pneumatic pressure within the tire is lost while the wheel is in motion on a vehicle, the forces involved will frequently cause one or both beads of the tire to become unseated from their respective bead seat surfaces. Should one or both beads enter the drop center of the wheel at this time, the same forces can cause the tire to wholly or partially dismount from the wheel which in turn may cause severe control problems for the operator of the vehicle, particularly if the wheel of concern is one of the steered wheels of the vehicle, typically a front wheel.

Over the years, a variety of proposals to overcome this problem have been made. For example, at least one tire manufacturer has provided its tubeless tires with an interior, pressurized, circumferential bladder having a substantially lesser outer diameter than that of the tire itself. When the tire is punctured or otherwise loses pneumatic pressure, the bladder remains inflated or, at least, deflates relatively slowly, allowing the driver of the vehicle to bring the same to a halt before all pneumatic pressure is lost. While the solution provided by this type of tire is satisfactory, it is also expensive with the consequence that the vast majority of tubeless tires in use today do not employ such a bladder.

Another proposal has involved the use of stationary, doughnut-like structures mounted on the wheel and within the tubeless tire. The doughnut-like structures are coaxial with the wheel and have outer diameters considerably greater than that of the wheel but less than that of the tubeless tire. When the tubeless tire loses pneumatic pressure, its tread is nonetheless maintained radially outwardly of the wheel by support from the interior of the wheel provided by the doughnut-like structure. Again, a solution that is satisfactory is provided, but it has met with very little commercial success. Not only is it expensive in terms of providing the doughnut-like support structure, but the presence of the doughnut-like support structure within the tire considerably interferes with the mounting or demounting of a tire on the wheel when tire servicing is required.

DISCLOSURE OF THE INVENTION

The present invention is directed to overcoming one or more of the problems as set forth above.

According to the present invention, there is provided a drop center wheel for use with a tubeless tire which has a pair of spaced, circumferential, radially outwardly extending bead retention flanges merging with respective circumferential bead seat surfaces. An intermediate, circumferential, drop center is disposed between and interconnects the bead seat surfaces. The drop center has a diameter less than the least diameter of the bead seat surfaces and is coaxial therewith. At least one blocking member is mounted in the drop center for movement between a first position well within the drop center such that its radially outermost point is located a radial distance from the axis of the wheel less than one-half of the least diameter of the bead seat surfaces and a second position extending from the drop center such that the radially outermost point is located a radial distance from the axis of the wheel greater than one-half of the least diameter of the bead seat surfaces. The blocking member has a blocking surface sufficiently close in the axial direction to at least one of the bead surfaces so as to prevent a tire thereon from slipping into the drop center when the blocking member is in the second position.

Thus, when the blocking member is in its first position, mounting and demounting of tires on the wheel can be easily accomplished through the use of the drop center in a conventional fashion. Conversely, when the blocking member is in second position, and it will be moved to that position when the wheel is rotated, it will prevent a bead from entering the drop center during wheel motion and prevent inadvertent whole or partial demounting of the tire during such wheel motion.

Other objects and advantages will become apparent from the following specification taken in connection with the accompanying drawings.

BRIEF DESCRIPTION OF DRAWINGS

FIG. 1 is a sectional view of a wheel embodying the invention and taken through the drop center thereof perpendicular to the axis of rotation of the wheel;

FIG. 2 is an enlarged, fragmentary, sectional view taken approximately along the line 2—2 of FIG. 1; and FIG. 3 is a view similar to FIG. 2 but illustrating a blocking member moved to a blocking position to prevent tire beads from entering the drop center of the wheel.

BEST MODE FOR CARRYING OUT THE INVENTION

A drop center wheel made according to the invention is illustrated in the drawings and with reference to FIGS. 1 and 2 is seen to include a drop center 10 which may be of conventional configuration and which is located centrally of the wheel. On opposite sides of the drop center 10, radially outwardly extending webs 12 merge with slightly conical bead seat surfaces 14. Each bead seat surface 14, remote from the drop center 10, merges into a circumferential, radially-outwardly-extending, bead retention flange 16.

As seen in FIG. 2, a tubeless tire (only part of which is shown) includes opposed beads 18 and 20 which are frictionally seated and sealed on corresponding ones of the bead seat surfaces 14. The beads 18 and 20 are retained on the wheel by respective ones of the bead retention flanges 16, as illustrated. However, during mounting or demounting of the tire upon the wheel, one or both of the beads 18 and 20, at various times in the mounting or demounting operation, will be disposed within the drop center 10 of the wheel as is well known since the beads 18 and 20 cannot be extended circumferentially. To this end, the diameter of the drop center 10 is less than the least diameter of either of the bead seat surfaces 14.

Whenever the beads 18 and 20 are not frictionally firmly engaged with the bead seat surfaces 14 as shown in FIG. 2, they may move towards each other toward the center of the wheel generally as illustrated in FIG. 3 and, as alluded to previously, if one or both enter the drop center 10, if the wheel is in motion, various forces can cause one or both beads 18 and 20 to then move past the corresponding bead retention flange 16 to partially or wholly demount from the wheel. In order to prevent control problems for the operator of a vehicle which are associated with partial or entire demounting of a tire from a wheel while the wheel is in motion, the invention contemplates a provision of means for preventing movement of the beads 18 and 20 into the drop center 10 while the wheel is rotating.

As seen in FIG. 1, mounted within the drop center 10 of the wheel is a blocking member 22 which is mounted for movement between the solid and dotted line positions indicated. When in the solid line position shown in FIG. 1, the radially outer extremity of the blocking member 22 is located well within the drop center 10 of the wheel such that the radial distance from the outermost point, shown at 24, to the wheel axis is less than half the least diameter of the bead seat surfaces 14. However, when the blocking member 22 moves to its second position, shown in dotted lines in FIG. 1, the radially outermost point thereof is now located a radial distance that is greater than one-half the least diameter of the bead seat surfaces 14. FIG. 2 illustrates the orientation of the blocking member 22 with respect to the beads 18 and 20 corresponding to the solid line position in FIG. 1 while FIG. 3 illustrates the orientation of the components assuming the dotted line position of FIG. 1.

The blocking member 22 is composed of a plurality of blocks, all designated 22, disposed circumferentially about the drop center 10 of the wheel in such a way as to counterbalance each other about the axis of rotation of the wheel shown as point A in FIG. 1. Each block 22 is mounted for movement as previously described by a spring strap 26 which is, of course, resilient, and which provides a means for normally urging the corresponding block 22 to the first position, that is, one well within the drop center 10 of the wheel. The strap 26 may be formed of metal or elastomer as desired. One end of each strap 26 is bonded or welded as at 28 to the drop center 10 while the other is suitably secured to a corresponding one of the blocks 22.

Returning to the blocks 22, each has a width that is on the order of the width of drop center 10 although generally slightly less than the latter. Opposite sides 30 and 32 of each block 22 operate as blocking surfaces when the block 22 is in its second position as illustrated in FIG. 3 for the adjacent beads 18 and 20, respectively, to prevent the same from entering the drop center 10 of the wheel.

In this connection, it is preferable that the length of each block 22 be such that the radially outer point 24 of the block 22, when in the second position, be disposed well radially outwardly in the beads 18 and 20 while the radially inner part of the block, shown at 36 in FIG. 3, be located radially inwardly of the beads 18 and 20. The urging force provided by the strap 26 urging the blocking members 22 to their first position is intended to be quite light so that the blocking members 22 will occupy their first position substantially only when the wheel is at rest. Upon any consequential rotation of the wheel, the mass of each block 22 is chosen so as to be such that the centrifugal force generated will overcome the urging force provided by the strap (26) so that such centrifugal force can move the blocks 22 to the dotted line or second position (22) as illustrated in FIG. 1.

Finally, as can be seen in the various Figs., the blocking surfaces 30 and 32 may be arcuate such that when the blocks 22 are in their second position, the radially outer extremities 40 and 42 of the surfaces 30 and 32 respectively will tend to overlie the beads 18 and 20 if unseated. This configuration provides further assurances that the beads cannot enter the drop center of the wheel to result in inadvertent demounting of the tire from the wheel. Preferably, the shape of the arc is such as to approximately conform to the axially inner parts of the beads so as to more evenly distribute axially inwardly directed forces applied by the beads to the blocks on the blocks 22 to minimize the possibility of failure due to localized stresses. However, if desired, it should be understood that the arcuate formation of the blocking surfaces 30 and 32 is not essential to the invention and that planar surface configuration could be utilized.

INDUSTRIAL APPLICABILITY

From the foregoing, it will be appreciated that a drop center wheel made according to the invention can be made quite inexpensively and yet provide for automatic movement of the blocking members to the blocking positions upon any significant wheel rotation. The blocking members and their mounts are simple in construction and therefore inexpensive and yet effective. Moreover, because the first position of each blocking member is chosen to be well within the drop center of the wheel, and the straps normally urge the blocking members to such a position, when the wheel is stationary, as when being serviced, the drop center of the wheel is relatively unobstructed so as to allow mounting and demounting of tires thereon in the conventional fashion.

Therefore, it will be appreciated that a drop center wheel made according to the invention eliminates control problems associated with loss of pneumatic pressure in tubeless tires mounted on drop center wheels by preventing such tires from demounting from the wheel during rotation thereof. At the same time, normal tire maintenance such as tire changing including mounting or demounting is not interfered with.

I claim:

1. In a drop center wheel for use with a tubeless tire having a pair of spaced, circumferential, radially outwardly extending bead retention flanges (16) on opposite ends of respective circumferential bead seat surfaces (14) and an intermediate circumferential drop center (10) between and interconnecting the bead seat surfaces and having a lesser diameter than the least diameter of the bead seat surfaces and being coaxial therewith, the improvement comprising a plurality of blocking members (22) spaced about the periphery of the wheel, each mounted in said drop center for movement, in response to rotation of the wheel from a first position well within the drop center such that its radially outermost point (24) is located a radial distance from the axis of the wheel less than one-half of said least diameter to a second position extending from said drop center such that said radially outermost point is located a radial distance from the axis of the wheel greater than one-half said least diameter, each said blocking member having a blocking surface (30,32) sufficiently close axially to at least one of said bead seat surfaces so as to prevent a tire bead (18,20) thereon from slipping into the drop center when said blocking member is in said second position, and means (26) for urging each said blocking member toward said first position irrespective of the angular position of the wheel.

2. The drop center wheel of claim 1 wherein said blocking member has a width on the order of that of said drop center, opposite sides (30, 32) of said blocking member each defining a blocking surface for the adjacent bead seat surface.

3. The drop center wheel of claim 1 wherein said blocking surface is arcuate and adapted to overlie an adjacent tire bead when the blocking member is in said second position and the tire bead is moved axially inwardly toward said drop center.

4. The drop center wheel of claim 3 wherein said arcuate blocking surface is configured to approximately conform to the axially inner surface of the adjacent tire bead.

5. In a drop center wheel for use with a tubeless tire having a pair of spaced, circumferential, radially outwardly extending bead retention flanges (16) on opposite ends of respective circumferential bead seat surfaces (14) and an intermediate circumferential drop center (10) between and interconnecting the bead seat surfaces and having a lesser diameter than the least diameter of the bead seat surfaces and being coaxial therewith, the improvement comprising at least one blocking member (22) mounted in said drop center for movement between a first position well within the drop center such that its radially outermost point (24) is located a radial distance from the axis of the wheel less than one-half of said least diameter and a second position extending from said drop center such that said radially outermost point is located a radial distance from the axis of the wheel greater than one-half said least diameter, said blocking member having a blocking surface (30,32) sufficiently close axially to at least one of said bead seat surfaces so as to prevent a tire bead (18,20) thereon from slipping into the drop center when said blocking member is in said second position, and means (26) for urging said blocking member to said first position, said urging means comprising resilient means (26).

6. The drop center wheel of claim 5 wherein said resilient means comprises a spring strap (26) secured at one end (28) to said drop center and secured at its opposite end to said blocking member to thereby both mount said blocking member for said movement and constitute said urging means.

7. In a drop center wheel for use with a tubeless tire having a pair of spaced, circumferential, radially outwardly extending bead retention flanges (16) on opposite ends of respective circumferential bead seat surfaces (14) and an intermediate, circumferential drop center (10) between and interconnecting the bead seat surfaces and having a lesser diameter than the least diameter of the bead seat surfaces and being coaxial therewith, the improvement comprising at least one blocking member (22) having a blocking surface (30,32), said blocking member being positioned in and connected to said drop center and movable between a first position at which a tire can be mounted on and demounted from the wheel and a second position at which the blocking surface is positioned at a location sufficient for preventing a tire bead (18,20) thereon from slipping into the drop center, said blocking member being moved to said second position in response to rotation of the wheel, and means (26) for urging said blocking member to said first position when the wheel is not rotating irrespective of the angular position of the wheel.

* * * * *